(12) United States Patent
Riley

(10) Patent No.: US 7,043,656 B2
(45) Date of Patent: May 9, 2006

(54) METHODS AND APPARATUS FOR EXTENDING A PHASE ON AN INTERCONNECT

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 484 days.

(21) Appl. No.: 10/352,711

(22) Filed: Jan. 28, 2003

(65) Prior Publication Data

US 2004/0148541 A1    Jul. 29, 2004

(51) Int. Cl.
*G06F 1/04* (2006.01)

(52) U.S. Cl. .................. 713/503; 713/500; 713/501; 713/502; 713/400; 713/401; 710/305; 710/307

(58) Field of Classification Search ........ 713/500–503, 713/400, 401; 710/305, 114, 307; 718/1; 711/143

See application file for complete search history.

(56) References Cited

U.S. PATENT DOCUMENTS

| | | | | |
|---|---|---|---|---|
| 4,908,749 | A * | 3/1990 | Marshall et al. | 710/114 |
| 5,353,423 | A * | 10/1994 | Hamid et al. | 711/143 |
| 5,796,977 | A * | 8/1998 | Sarangdhar et al. | 718/1 |
| 6,449,677 | B1 * | 9/2002 | Olarig et al. | 710/305 |

OTHER PUBLICATIONS

D. Riley, A PCI-X 2.0 Multi-Drop Alternative, Mar. 30, 2002, Compaq Inspiration Technology (10 p.).
PCI-X Protocol Addendum to the PCI Local Bus Specification Revision 2.0, Jul. 29, 2002 (50 p.).

* cited by examiner

*Primary Examiner*—A. Elamin

(57) ABSTRACT

Interconnect logic performs a transaction on an interconnect. The transaction may include multiple phases and the interconnect logic may include a counter state machine coupled to an interconnect state machine. The counter state machine may assert a signal to the interconnect state machine that may cause the interconnect state machine to prolong one or more phases of the transaction.

36 Claims, 3 Drawing Sheets

METHODS AND APPARATUS FOR EXTENDING A PHASE ON AN INTERCONNECT

BACKGROUND

Computers typically include a plurality of electrical devices connected via one or more interconnects. The term "interconnect" generally refers to a mechanism linking together two or more devices. Such devices may include microprocessors, random access memory ("RAM"), read only memory ("ROM"), bridge logic, input/output ("I/O") controllers, network interface controllers ("NICs"), etc. A bus generally comprises a collection of individual data, address and control signals which coordinate the efficient transmission of commands and responses between devices connected to the bus.

Interconnects may be categorized as "multi-drop" or "point-to-point" interconnects. A multi-drop interconnect permits three or more devices to be connected electrically on the same physical interconnect. In this configuration, one device may "master" a transaction while the other devices "listen" to activity on the interconnect. As such, the interconnect bandwidth is shared between the devices. A point-to-point interconnect permits only two devices to be electrically connected on the same physical interconnect. Various considerations exist when designing an interconnect structure and protocol. A multi-drop interconnect generally scales better when all the devices can be electrically tied together for example, by the electrical traces on the system board. If the number of devices to be interconnected is relatively large (for example, greater than 5), a bridge device may be used to create a new segment on which additional devices may be connected. However, while a multi-drop interconnect can be scaled to support a larger number of devices by using bridges, multi-drop interconnects are generally restrictive in the size of the topology as a result of additional considerations. Such considerations may include restrictions imposed by system board routing distance between the devices and a frequency limitation resulting from either the clock frequency becoming too high or signal quality degradation. A multi-drop interconnect also has the disadvantage of allowing one device to bring down all its neighboring devices that are electrically tied together on the same interconnect. By contrast, a point-to-point interconnect with only two devices connected on any of the interconnect links (or "segments"), may allow greater distances via electrical board traces or cabled interconnect between the devices and better reliability since all endpoints are generally electrically isolated from other devices via a hub or a switching device. As a result of using hubs or switching agents point-to-point interconnects typically include additional components (or the equivalent function included in one of the devices) to scale the system. A point-to-point interconnect that is linked via hubs exhibits similar characteristics to a multi-drop interconnect segment. In both cases, the bandwidth is shared between all the devices since only one device is permitted to master or initiate a transaction at a time. As a result, the mastering device could expose all devices to any failures in its interface protocol. A point-to-point interconnect connected via switches, however, not only isolates the devices electrically, like a hub, but also isolates packets (protocol), thereby allowing devices to send or receive packet information independently.

The computer and computer-related industries benefit from the promulgation of various standards governing the implementation and usage of various aspects of the computer. Various interconnect protocols are available and widely used to control the transfer of data. Examples of such interconnect standards include Peripheral Component Interconnect ("PCI"), PCI-X (a variation of PCI), Small Computer System Interface ("SCSI"), Industry Standard Architecture ("ISA"), etc. By using a standardized bus protocol, disparate device manufacturers can make computer-related components that, when assembled into the computer, will work together. The process of adopting and incorporating new standards into products is time consuming, expensive, and problematic from the perspective of backward compatibility to existing systems.

The PCI-X standard currently supports data rates of 266 megatransfers per second ("MT/s") to 533 MT/s, but only in a point-to-point configuration. This is the case because PCI-X 266 and PCI-X 533 utilize a terminated signaling scheme to achieve the higher signaling rates. For embedded applications, which have typically used PCI-X in a multi-drop configuration, for cost effectively interconnecting 3–5 devices (not requiring hubs or switches to scale beyond 2-devices), the point-to-point restriction of PCI-X 266 and PCI-X 533 is viewed as a significant limitation. One solution to this problem might be to design a new bus protocol altogether. As explained above, this approach is time consuming and expensive. Thus, a solution which solves one or more of these problems is desirable.

BRIEF SUMMARY OF THE EMBODIMENTS OF THE INVENTION

One or more of the problems noted above may be addressed by interconnect interface logic which performs transaction operations, by extending one or more phases of the transactions. In various embodiments, a counter state machine asserts a signal to an interconnect state machine causing the interconnect state machine to extend one or more phases of the transaction. The phase so extended may include information to be transferred.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. Although some, or all, of these embodiments may be preferred, the embodiments should not be interpreted or otherwise used as limiting the disclosure, including the claim, unless otherwise specified. In addition, one skilled in the art will understand that the following description has broad application, and the discussion of any embodiments is meant only to be exemplary, and not intended to intimate that the scope of the disclosure, including the claims, is limited to these embodiments.

Figure 1:
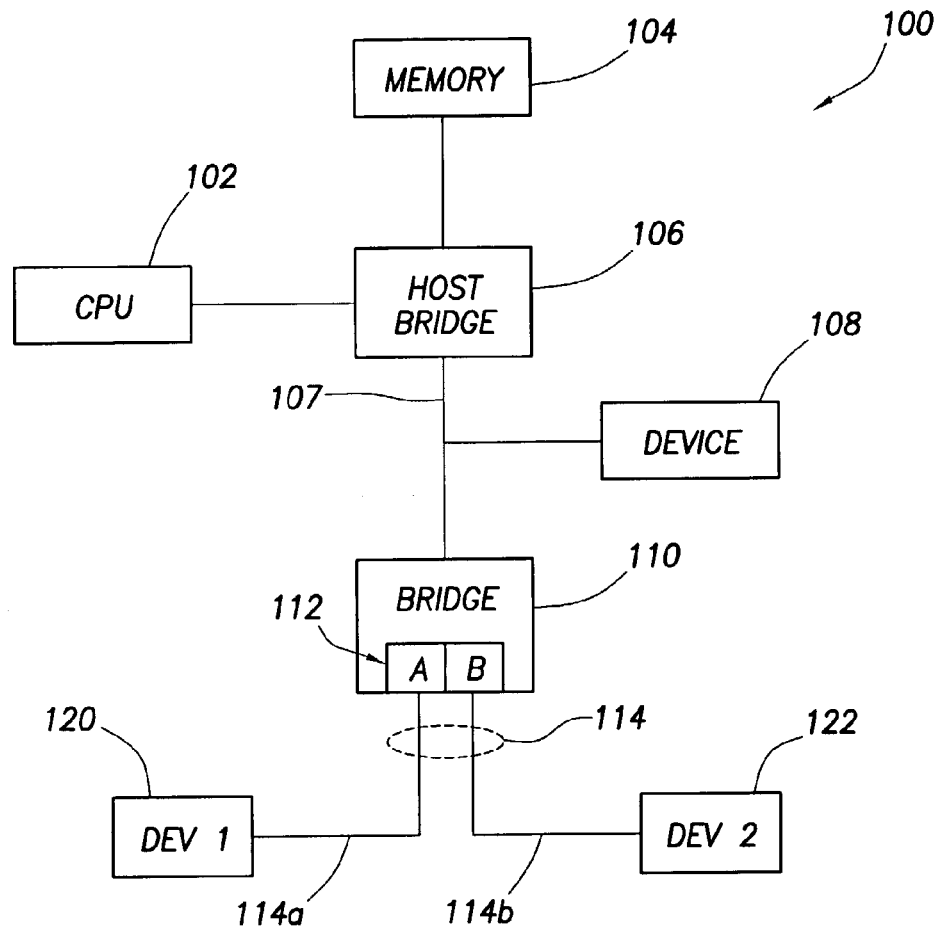
FIG. 1 shows a system block diagram in accordance with embodiments of the invention.

Referring now to FIG. 1, system 100 is shown in accordance with embodiments of the invention. The system 100 may comprise a computer system or other electronic system. As shown in FIG. 1, the system 100 may include a central processing unit ("CPU") 102, memory 104, a host bridge 106, bridge 110, and one or more devices 108, 120, 122. The CPU 102 and memory couple to the host bridge 106. The host bridge may include a memory controller to control access to memory 104 by the CPU 102 and other devices in the system. Bridges 106 and 110 and device 108 couple to each other via a bus 107. Device 108 may be of any desired type of device. Examples include input devices (e.g., keyboard, keyboard controller, etc.), output device (e.g., display, graphics controller, etc.), network interface controller ("NIC"), etc. Other devices and logic may be included in the system and coupled to interconnect 107 which may comprise of one or more segments. The interconnect 107 may comprise any suitable bus protocol. A suitable example is the Peripheral Component Interconnect ("PCI") bus.

Bridge 110 provides connectivity to one or more devices 120, 122. Such devices may be anything desired. Examples include NICs, small computer system interface ("SCSI") controllers, etc. Two devices 120, 122 are shown in the example of FIG. 1, but any suitable number (one or more) of devices may be included by adding hubs, switches, or other logic.

In accordance with various embodiments of the invention, bridge 110 couples to devices 120, 122 via an interconnect link 114 from interface 112. The interconnect link 114 may comprise separate links that connect the bridge 110 to devices 120, 122 as shown. However, although two links 114a,b are shown in FIG. 1, a single link or more than two links may be implemented as desired generally depending on the number of devices to be coupled to the bridge 110.

An interconnect protocol may be implemented in conjunction with each link 114a,b. The protocol may specify various interconnect characteristics such as the timing of various control signals that may be used to perform, for example, read and write transactions, the response the bus may perform in the event an error is detected, etc. In accordance with some embodiments of the invention, the protocol implemented on the links 114a and 114b may comprise the PCI-X protocol which is described in PCI-X Protocol Addendum to the PCI Local Bus specification, revision 2.0, Jul. 29, 2002 incorporated herein by reference.

According to the conventional PCI and PCI-X 1.0 standard, a device that supports the PCI protocol implements at least 32 bits of address and data ("A/D") signals and approximately 12 control signals (the actual number of control signals may depend on the class of device and solution). The PCI-X standard specifies 32 bit addresses and data elements may be transferred across the 32 bits of address and data signals. In accordance with various embodiments of the invention, however, each link 114a,b on which PCI-X is implemented includes fewer A/D signals and control and other signals than the minimum number disclosed by the conventional PCI and PCI-X 1.0 standard. In short, the PCI-X protocol is implemented on a link that has fewer signals than for which the conventional PCI and PCI-X protocol was designed.

The following exemplary explanation assumes that the PCI and PCI-X 1.0 114 link includes 32 address/data signals (A/D[31:0]). In this example, PCI and PCI-X may be implemented so as to reduce the interface pin count between bridge 110 and devices 120, 122. The pin count associated with the address/data ("A/D") signals may be reduced to, for example and without limitation, 16 bits, 8 bits, 4 bits or 1 bit. The command byte enable signals ("C/BE") and any other functional group of signals(e.g., ECC, Strobe) may also be reduced. The following explanation illustrates how the conventional PCI and PCI-X protocol may be implemented with fewer bus signals than for which the protocol was originally designed.

In general, a PCI/PCI-X transaction (e.g., a write transaction) includes multiple phases. A basic PCI transfer may comprise an address phase and a response/data phase. A PCI-X transaction may include an attribute phase and the response phase may be separate from the data phase. For PCI-X the data phase is optional. In accordance with embodiments of the invention, one or more of these transaction phases may be extended (i.e., lengthened with respect to time) to span multiple PCI clock cycles so that more data can be transferred as the device interface pin count is reduced. In general, transition phases may be extended that have information to be transferred.

Figure 2:
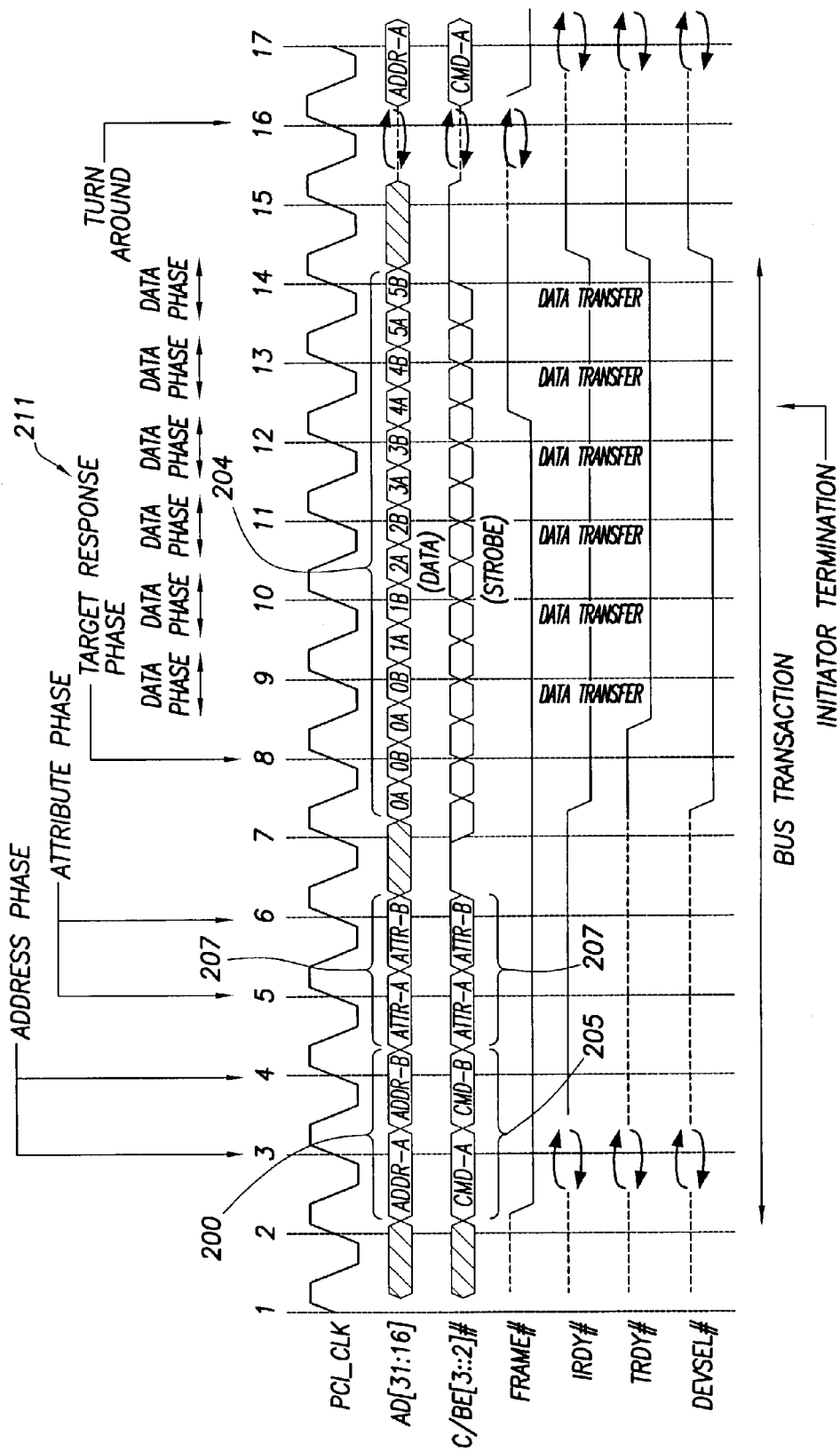
FIGS. 2 and 3 show timing diagrams illustrating exemplary operation of embodiments of the invention.

Referring now to an exemplary PCI-X 266 write transaction in FIG. 2, a 32-bit address is transferred in an extended address phase 200. This extended phase 200 may include two portions labeled as "ADDR-A" and "ADDR-B" and coinciding with two clock cycles. This two clock cycle extended address phase permits 32 bits of address to be transferred on a 16 bit address bus (albeit requiring twice as many clock cycles). Further, the exemplary embodiment of FIG. 2 includes six, 16-bit data phases 204 (0 through 5). As shown, each data phase is transferred in two sub-phases (e.g., "0A" and "0B", "1A" and "1B", and so on). Further still, various control bits may be extended to span multiple PCI clock cycles to track the A/D lanes. For example, FRAME#, IRDY#, TRDY#, and DEVSEL# may be extended to track the A/D lanes.

Table I below illustrates an embodiment of which PCI-X signals may be used to implement an interconnect 114a,b.

TABLE I

Bus Pin Sharing

| | Device Internal 32-Bit Signal Sharing | |
|---|---|---|
| Device External Signal Name | 16-Bit Interface First Portion | 16-Bit Interface Second Portion |
| AD[16] | AD[00] | AD[16] |
| AD[17] | AD[01] | AD[17] |
| AD[18] | AD[02] | AD[18] |
| AD[19] | AD[03] | AD[19] |
| AD[20] | AD[04] | AD[20] |
| AD[21] | AD[05] | AD[21] |
| AD[22] | AD[06] | AD[22] |
| AD[23] | AD[07] | AD[23] |
| AD[24] | AD[08] | AD[24] |
| AD[25] | AD[09] | AD[25] |
| AD[26] | AD[10] | AD[26] |
| AD[27] | AD[11] | AD[27] |

TABLE I-continued

Bus Pin Sharing

Device Internal 32-Bit Signal Sharing

| Device External Signal Name | 16-Bit Interface First Portion | 16-Bit Interface Second Portion |
|---|---|---|
| AD[28] | AD[12] | AD[28] |
| AD[29] | AD[13] | AD[29] |
| AD[30] | AD[14] | AD[30] |
| AD[31] | AD[15] | AD[31] |
| ECC[2] | ECC[0] | ECC[2] |
| ECC[3] | ECC[1] | ECC[3] |
| ECC[4] | ECC[6] | ECC[4] |
| ECC[5] | E16 | ECC[5] |
| C/BE[2]# | C/BE[0]# | C/BE[2]# |
| C/BE[E]# | C/BE[1]# | C/BE[E]# |

As indicated by the exemplary embodiment of Table I, the interconnect 114a or 114b signals may comprise the signals in the left-hand column labeled "Device External Signal Name." A such, interconnect 114a, for example, may include address/data bus signals AD[16:31], ECC[2:5], and C/BE [2]# and C/BE[E]# signals. In the first portion of a transaction (e.g., the write transaction of FIG. 2), the address information the PCI-X specification specifies as being encoded on address/data bits AD[00:15] may be placed on address/data bits AD[16:31]. The first portion generally refers to the initial portion of the various phases (e.g., the ADDR-A portion, CMD-A portion, etc.). Similarly, the error detection and control information the PCI-X specification specifies as being encoded on the ECC[0,1,6], E16 and C/BE[0,1]# bits may be placed on the ECC[2:5] and C/BE [2,E]# bits, respectively. In the second portion of the transaction, the address information the PCI-X specification specifies as being encoded on address/data bits AD[16:31] may be placed on address/data bits AD[16:31]. The second portion generally refers to the subsequent portion of the various phases (e.g., the ADDR-B portion, CMD-B portion, etc.). Similarly, the error detection and control information the PCI-X specification specifies as being encoded on the ECC[2:5] and C/BE[2,E]# bits may be placed on the ECC [2:5] and C/BE[2,E]# bits, respectively.

Figure 3:
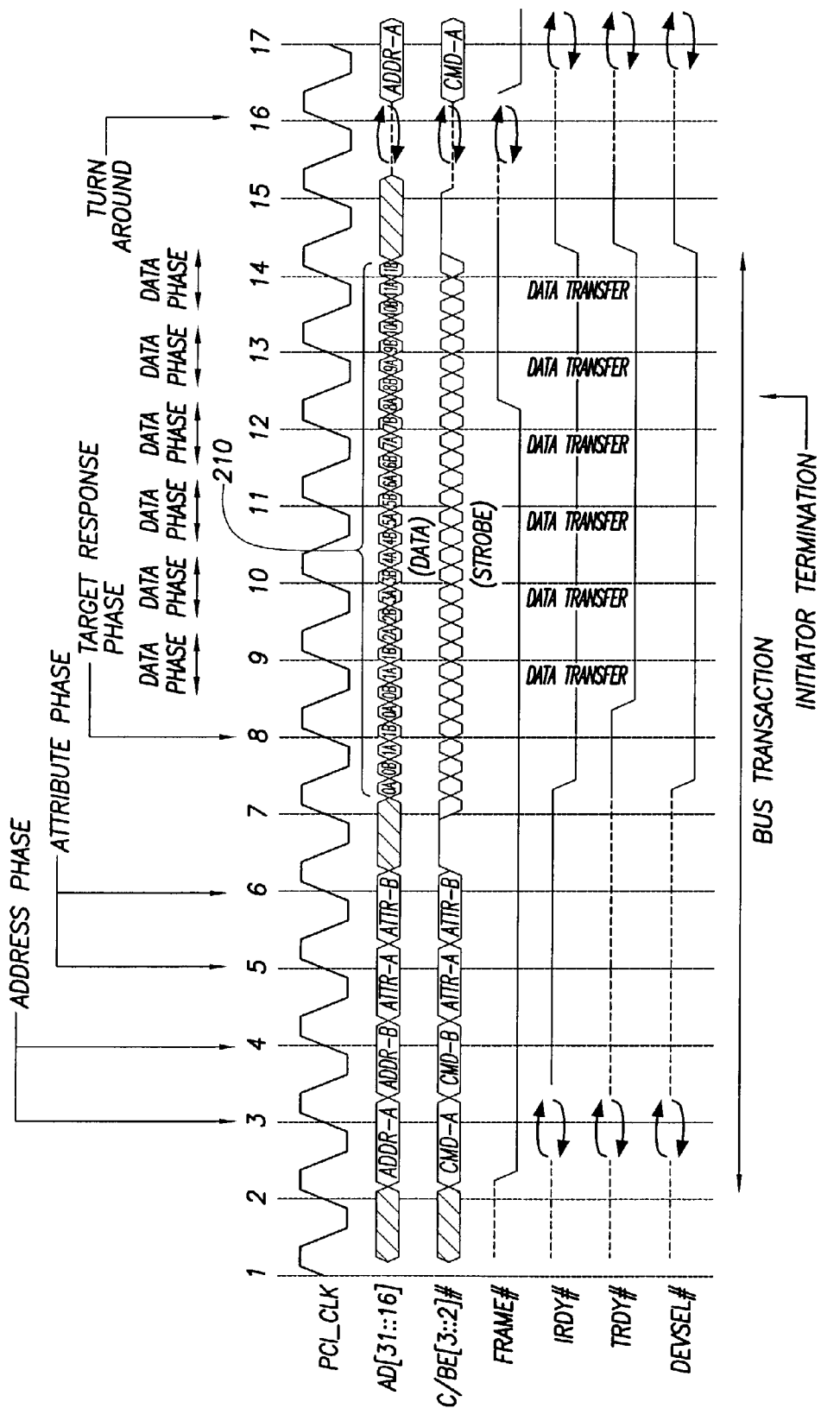

FIG. 3 shows another exemplary timing diagram in accordance with other embodiments of the invention. This diagram illustrates a PCI-X 533 burst write transaction implemented on a 16-bit interconnect. As shown, 12 data phases 210 (0–11) are shown. Each data phase may be transferred in two portions (i.e., clock cycles) as shown.

Table II below shows the number of signals that may be used to implement PCI-X 266 and PCI-X 533 transactions using ECC for error protection for links 114a,b and for different interconnect bit widths.

TABLE II

| Signal Grouping | 32-bit | 16-bit | 8-bit |
|---|---|---|---|
| A/D | 32 | 16 | 8 |
| C/BE | 4 | 2 | 2 |
| ECC | 9 | 6 | 4 |
| Control Signals | 6 | 6 | 6 |
| Arbitration | 2 | 2 | 2 |
| System Clock | 2 | 2 | 2 |
| Total Pins | 58 | 34 | 24 |

Table III below shows the number of signals that may be used for transactions that include parity error protection for links 114a,b.

TABLE III

| Signal Grouping | 32-bit | 16-bit | 8-bit |
|---|---|---|---|
| A/D | 32 | 16 | 8 |
| C/BE | 4 | 2 | 1 |
| Parity | 3 | 3 | 3 |
| Control Signals | 6 | 6 | 6 |
| Arbitration | 2 | 2 | 2 |
| System Clock | 2 | 2 | 2 |
| Total Pins | 52 | 31 | 22 |

Figure 4:
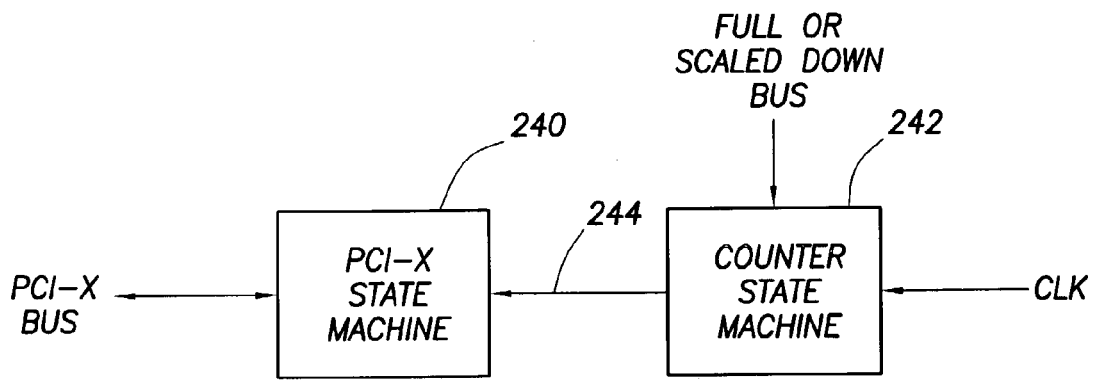
FIG. 4 shows a system drawing of state machines in accordance with embodiments of the invention.

FIG. 4 shows a PCI-X state machine 240 coupled to a counter state machine 242. The PCI-X state machine controls the operation of the interface hardware 112 (FIG. 1). The PCI-X state machine may implement the PCI-X protocol stated in the PCI-X specification, incorporated by reference as noted above. The counter state machine 242 determines, or otherwise is informed, that the multiple clocks are required for the address, attribute, and data phases. The control signals preferably are extended to match the number of clocks inserted within the address, attribute and data phases as a result of the width reduction to the A/D and C/BE lanes. The Target Response phase 211 may not have to be extended since data is not always transferred in a PCI-X transaction. Similarly, for conventional PCI the Target Response/Data phase may not have to be extended if no data is being transferred. This information may be programmed into the system or designed into the counter state machine 242. The counter state machine 242 responds by causing the PCI-X state machine 240 to lengthen the address, attribute, and data, phases appropriately as described above. In accordance with some embodiments of the invention, the PCI state machine includes logic which checks for a counter signal 244 from the counter state machine to determine whether an address, data, or control signal phase should be prolonged or released. For example, referring briefly to FIG. 2, upon completion of address phase 200, the PCI-X state machine 240 checks counter signal 244 from the counter state machine 242 and, determining that the signal 244 is asserted, prolongs the transmission of the address into the subsequent phase 202. Thus, the signal 244 from the counter state machine 242 may be asserted to indicate that a phase should be prolonged or deasserted to indicate that the phase should be prolonged. The counter state machine 242 receives a clock signal ("CLK") and asserts the counter signal 244 for an appropriate length of time, as described above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a CPU; and
   a bridge coupled to said processor and adapted to couple to a device via any one of a plurality of interconnects that differ in at least a number of bits comprising the interconnects;

wherein said bridge performs a multi-phase cycle on said interconnect, said cycle having at least one phase in which information is transferred that, based on a number of bits comprising the interconnect, is prolonged by a counter state machine coupled to an interconnect state machine, said counter state machine asserts a signal to said interconnect state machine causing said interconnect state machine to prolong a phase of the cycle; and wherein if said at least one phase is prolonged, said prolonged phase comprises a plurality of clock cycles, and information is transferred over said interconnect in said plurality of clock cycles.

2. The computer system of claim 1 wherein said prolonged phase contains address information.

3. The computer system of claim 2 wherein said prolonged phase comprises at least two clock cycles of address information.

4. The computer system of claim 1 wherein said prolonged phase contains data information.

5. The computer system of claim 4 wherein said prolonged phase comprises at least two clock cycles of data information.

6. The computer system of claim 1 wherein said prolonged phase contains control information.

7. The computer system of claim 1 wherein said interconnect state machine detects said signal being asserted and causes said phase to be prolonged by at least one additional clock cycle.

8. Interconnect logic which causes a cycle to be run on an interconnect that has any one of a plurality of configurations, comprising:
  an interconnect state machine;
  a counter state machine coupled to a said interconnect state machine;
  wherein said cycle has multiple phases and, based on the configuration of the interconnect, said counter state machine asserts a signal to said interconnect state machine causing said interconnect state machine to prolong at least one phase in which information is transferred; and
  wherein, for at least one interconnect configuration, the counter state machine does not assert the signal to cause said interconnect state machine to prolong the at least one phase.

9. The interconnect logic of claim 8 wherein a prolonged phase contains address information.

10. The interconnect logic of claim 9 wherein a prolonged phase comprises at least two clock cycles in which address information is provided.

11. The interconnect logic of claim 8 wherein a prolonged phase contains data information.

12. The interconnect logic of claim 11 wherein a prolonged phase comprises at least two clock cycles in which data information is provided.

13. The interconnect logic of claim 8 wherein a prolonged phase contains control information.

14. The interconnect logic of claim 8 wherein said interconnect state machine detects said signal being asserted and causes a phase to be prolonged by at least one additional clock cycle.

15. The interconnect logic of claim 8 wherein the plurality of configurations differ in at least a number of bits comprising the interconnects.

16. Interconnect logic which causes a cycle to be run on an interconnect that has any one of a plurality of configurations, comprising:
  a means for asserting interconnect signals to run said cycle, said cycle having multiple phases; and
  a means for asserting a counter signal, based on the configuration of the interconnect, to said means for asserting interconnect signals causing said means for asserting interconnect signals to prolong at least one phase in which information is transferred;
  wherein said prolonged at least one phase comprises a plurality of clock cycles, and said information is transferred over said interconnect in said plurality of clock cycles.

17. The interconnect logic of claim 16 wherein a prolonged phase contains address information.

18. The interconnect logic of claim 17 wherein a prolonged phase comprises at least two clock cycles in which address information is provided.

19. The interconnect logic of claim 16 wherein a prolonged phase contains data information.

20. The interconnect logic of claim 19 wherein a prolonged phase comprises at least two clock cycles in which data information is provided.

21. The interconnect logic of claim 16 wherein a prolonged phase contains control information.

22. The interconnect logic of claim 16 wherein said means for asserting interconnect signals includes a means for detecting said counter signal being asserted and causing another clock cycle to be included to prolong a phase.

23. The interconnect logic of claim 16 wherein the plurality of configurations differ in at least a number of bits comprising the interconnects.

24. A method, comprising:
  a counter state machine detecting, based on a configuration of an interconnect, whether phases of an interconnect transaction are to be prolonged;
  the counter state machine asserting a counter signal to an interconnect state machine indicative of whether prolonged phases of an interconnect transaction are needed;
  the interconnect state machine causing multiple clock cycles to be included in a phase of a transaction in response to said counter signal indicating that prolonged phases are needed, said phase including information to be transferred.

25. The method of claim 24 wherein a prolonged phase contains address information.

26. The method of claim 25 wherein a prolonged phase comprises at least two clock cycles in which address information is provided.

27. The method of claim 24 wherein a prolonged phase contains data information.

28. The method of claim 27 wherein a prolonged phase comprises at least two clock cycles in which data information is provided.

29. The method of claim 24 wherein a prolonged phase contains control information.

30. The method of claim 24 wherein said interconnect state machine detects said signal being asserted and causes another clock cycle to be included to prolong a phase.

31. A computer system, comprising:
  a CPU;
  a means for generating a signal indication of whether prolonged phases of an interconnect cycle are needed based on a configuration of an interconnect; and
  a means for receiving said signal and for causing said prolonged phases to occur in which information is transferred.

32. The computer system of claim 31 wherein said prolonged phases include one or more type of information selected from the group consisting of address information, data information, and control information.

33. Logic which causes a multi-phase cycle to be run as a PCI-X bus, comprising:
- a PCI-X state machine;
- a counter state machine coupled to said PCI-X state machine;
- wherein, in response to information from the counter state machine, said PCI-X state machine creates an address phase encoding a M bit address that is transferred on N bits of a PCI-X bus, where M is greater than N;
- wherein said information includes information as to a configuration of an interconnect to which said logic is adapted to be coupled.

34. The logic of claim 33 wherein M is greater than or equal to 32 and N is less than 32.

35. The logic of claim 34 wherein N is 16.

36. The logic of claim 33 wherein the cycle also includes a data phase encoding R bits of data on 5 T bits of the PCI-X bus wherein R is greater than T.

* * * * *